United States Patent
Hoshino (10) Patent No.: US 7,583,302 B2
(45) Date of Patent: Sep. 1, 2009

(54) IMAGE PROCESSING DEVICE HAVING BLUR CORRECTION FUNCTION

(75) Inventor: Hiroyuki Hoshino, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 478 days.

(21) Appl. No.: 11/594,534

(22) Filed: Nov. 8, 2006

(65) Prior Publication Data

US 2007/0110170 A1    May 17, 2007

(30) Foreign Application Priority Data

Nov. 16, 2005    (JP)   ............................. 2005-331765

(51) Int. Cl.
*H04N 5/217*    (2006.01)
*H04N 5/228*    (2006.01)

(52) U.S. Cl. .................................. 348/241; 348/208.1

(58) Field of Classification Search ............ 348/333.01, 348/208.1, 241

See application file for complete search history.

(56) References Cited

U.S. PATENT DOCUMENTS 5,870,634 A * 2/1999 Sugaya et al. ................. 396/52
6,097,896 A * 8/2000 Usui ............................ 396/55
6,778,210 B1 * 8/2004 Sugahara et al. ......... 348/208.4
2006/0280249 A1 * 12/2006 Poon ...................... 375/240.16

FOREIGN PATENT DOCUMENTS

JP       3213348 B2    7/2001

* cited by examiner

*Primary Examiner*—James M Hannett
(74) *Attorney, Agent, or Firm*—Frishauf, Holtz, Goodman & Chick, P.C.

(57) ABSTRACT

Disclosed is an imaging device 100 connected to an external display device 600. The imaging device 100 includes a decoder 5 that, based on an instruction to reproduce coded moving image data recorded in any one of a internal recorder 3, a memory card M and an external recording device 500, decodes the data and sequentially obtains a plurality of frames in a predetermined order, a blur estimator 10C that sequentially obtains a total motion vector of each frame corresponding to an obtaining speed and a predetermined order of frames, a blur correction processor 10 that sequentially corrects the blur of the frames based on respective total motion vectors, and a second display processor 8 that sequentially outputs the blur corrected frames to the external display. Blur correction processing for moving images output to the external display is performed suitably.

11 Claims, 10 Drawing Sheets

IMAGE PROCESSING DEVICE HAVING BLUR CORRECTION FUNCTION

CROSS-REFERENCE TO RELATED APPLICATION

This application is based upon and claims the benefit of priority from the prior Japanese Patent Application No. 2005-331765, filed on Nov. 16, 2005, the entire contents of which are incorporated herein by reference.

BACKGROUND OF THE INVENTION

The present invention relates to an image processing device and a program, to compensate blur of moving image to be output to an external display device.

Conventionally, as an imaging device such as a digital camera or the like, one that compensates blur that is generated by imaging moving image, by image processing (what is called blur correction), and then records it as moving image file, has been known (refer to Patent Document 1: Japanese Patent No. 3213348).

In addition, an imaging device having a configuration which enables to output image information to be replayed to an external display such as a television or the like, through an external output terminal, for example, a reproducing apparatus such as a DVD player, is also known.

Recently, video recording/reproducing apparatuses such as DVD recorders or the like, which have a recording function for digitally recording broadcast television programs in addition to a reproducing function, become widely used. Although these video recording/reproducing apparatuses record the broadcast program as image information, each apparatus does not have blur correction function because it does not image and record the programs with the apparatus held by hand.

However, the image information reproduced by such a video recording/reproducing apparatus sometimes includes blurring of images due to hand movement. Therefore, there has been a problem that when the image information is reproduced and displayed on an external display apparatus, the image which is not compensated for blur or is recorded under an incomplete state, cannot be enjoyed with a blur correction.

SUMMARY OF THE INVENTION

The present invention has been developed in view of the above-described circumstances.

In accordance with a first aspect of the invention, the image processing device having a blur correction function comprises:

a connecting section to connect to an external device;

a frame obtaining section to obtain a plurality of frames constituting moving image data sequentially, based on an instruction to reproduce moving image data recorded in a predetermined form, corresponding to a speed and an order of reproducing a moving image;

a motion compensation information obtaining section to obtain respective motion compensation information of the frames obtained by the frame obtaining section, corresponding to the speed and the order of reproducing the moving image;

a blur correcting section to perform blur correction to the frames obtained by the frame obtaining section sequentially, based on the motion compensation information obtained by the motion compensation information obtaining section; and an externally outputting section to output the frames sequentially, to which the blur correction has been performed by the blur correcting section, to the external device connected to the connecting section.

DETAILED DESCRIPTION OF THE PREFERRED EMBODIMENTS

First Embodiment

Figure 1:
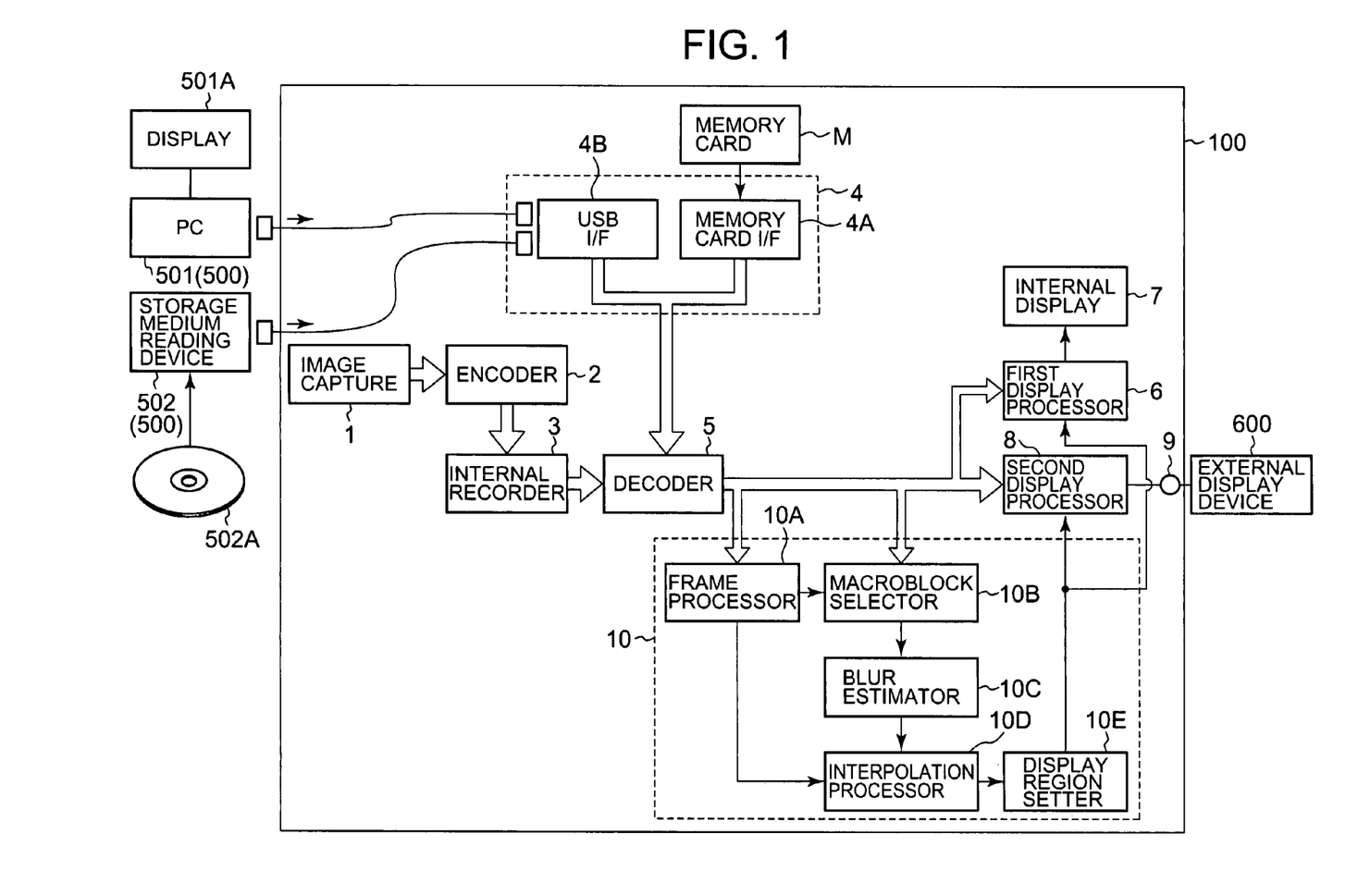
FIG. 1 is a block diagram showing a principal structure of an imaging device according to a first embodiment which is given as a preferable example of an image processing device to which the present invention is applied.

FIG. 1 is a block diagram showing a principal structure of an imaging device according to a first embodiment which is given as a preferable example of an image processing device to which the present invention is applied. FIG. 1 shows a state in which the imaging device 100 is connected to a personal computer (PC) 501, a storage medium reading device 502, an external display device 600 and the like.

The imaging device 100 according to the first embodiment is, for example, applied to a digital camera or the like, and encodes and records an imaged moving image by using an information compression technique, such as MPEG 4 (Moving Image Experts Group) or the like that is a coding standard for moving images. The imaging device 100 is also connected to an external recording device 500 (which will be explained later), such as a PC 501, a storage medium reading device 502, or the like, through a predetermined communication cable or the like, and can display a given moving images based on encoded moving images recorded in these recording device 500.

In particular, as shown in FIG. 1, the imaging device 100 structured with an image capture 1 to image a still image or moving images of an object, an encoder 2 to encode an image captured by the image capture 1 with a predetermined information compression technique, an internal recorder 3 to record an encoded image data encoded by the encoder 2, an external recording control section 4 that is connected to a memory card (external recording medium) M and the external recording device 500, both recording encoded moving image data, for controlling communication of various kinds of information such as encoded moving image data, a decoder 5 to decode the encoded moving image data recorded in the internal recorder 3, the memory card M and the external recording device 500, an internal display 7 connected to a first display processor 6 for displaying a given image, an externally outputting terminal 9 connected to a second display processor 8 for outputting given image data to the external display device 600, and a blur correction processing unit 10 which corrects blur of a moving image to be displayed on the internal display 7 or to be output through the externally outputting terminal 9.

The image capture 1 is, for example, constituted so as to switch between still image capture mode and moving image capture mode based on a given operation by a changing-over switch (not shown). Specifically, the image capture 1 includes an imaging lens group which is not shown, having a focusing function and a zooming function, an electronic image capture having CCD (charge coupled device) or CMOS (complementary metal-oxide semiconductor) for converting a subject image, which has passed through the imaging lens group, to two-dimensional image data, a signal processing section that performs given image processing for the image data output from the electronic image capture, and an imaging control section that controls the electronic image capture, the signal processing section and the like. Under control of the imaging control section, the image data to which image processing has been applied, are output from the signal processing section to the encoder 2.

The encoder 2 encodes moving image data, for example, by an information compression technique such as MPEG 4 that performs motion compensation. Specifically, the encoder 2 performs an information compression encode processing for the moving image data input from the image capture 1, including motion compensation (MC) and discrete cosine transform (DCT). The motion compensation reduces the amount of codes by using time correlation between frames F constituting the moving image data. The DCT reduces the amount of codes by using spatial correlation between frames F.

The encoder 2, for example, performs quantization by dividing DCT coefficients calculated through DCT by a given Q factor decided in consideration of a visual characteristic.

The motion compensation is inter-frame prediction that includes, for example, partitioning input image data into macroblocks, each macroblock having a square region of 16×16 pixels as a unit, searching a given range in a reference image to detect a block so as to get a minimum error among the macroblocks, and compensating the amount of motion. Here, the amount of shift in horizontal and vertical directions for the detected block having the minimum error within the reference image represents a motion vector.

In the motion compensation, for example, there are generated P-pictures that are inter-frame forward predictive coded images and B-pictures that are bidirectionally predictive coded images, with adopting an I-picture that is an intra-frame coded image, as a reference.

The discrete cosine transform (DCT) is a kind of Fourier transform and transforms a two-dimensional image into two-dimensional frequencies to separate into low-frequency components that are easy to be recognized and high-frequency components that are hard to be distinguished. Specifically, in the DCT, the difference between the motion-compensated image and an input image is divided into blocks, each having 8×8 pixels as a unit, and two-dimensional DCT is applied to each block.

For the I-picture, since it is an intra-frame coded image, the difference is not obtained and DCT calculation is applied to the input image itself.

The internal recorder 3, for example, has a RAM, which is a rewritable semiconductor memory or the like, and temporarily stores still image data and moving image data that are encoded by the encoder 2.

In a case of storing the temporarily stored data permanently, the data are transferred and stored to a memory card M, an external recording device 500 or the like, through the external recording control section 4.

The external recording control section 4 includes, for example, a memory card interface (I/F) 4A configured for the nonvolatile memory card M to be removably attached thereto, a USB interface (I/F; recording device connecting section) 4B for connecting to the external recording device 500 including a PC 501 and a storage medium reading device 502. The external recording control section 4, for example, controls a processing of obtaining moving image data recorded in the memory card M through the memory card I/F 4A, and also a processing of obtaining moving image data recorded in the external recording device 500 through the USB I/F 4B.

Here, the PC 501 has, for example, a display 501A that displays a given image. The storage medium reading device 502 reads out various kinds of information recorded, for example, in a magnetic or optical storage medium 502A. The storage medium reading device 502, for example, may preferably write various kinds of information into a predetermined storage medium 502A.

When an instruction to reproduce a moving image is input by a predetermined operation on an operation unit, for example, the decoder 5 decodes the encoded moving image data stored in the internal recorder 3 or the encoded moving image data obtained through the external recording control section 4, and generates a bit stream arranged in an order of replay of a plurality of frames F, . . . constituting the moving image data.

When generating the bit stream, the whole encoded moving image data are not decoded at one time collectively to transfer the bit stream sequentially to a frame processor 10A and a macroblock selector 10B, which constitutes a blur correction processing unit 10, and a first and second display processors 6 and 8, but are decoded in a order of frames F that are necessitated by the frame processor 10A, the macroblock selector 10B, and the first and second display processors 6 and 8, and the like, while minimum data necessary for decoding process of the frames F are read out sequentially from the internal recorder 3 or the recording control section 4 into a predetermined working memory, and transferred sequentially to the frame processor 10A, the macroblock selector 10B, and the first and second display processors 6 and 8. That is, the decoder 5 constitutes a frame obtaining section for sequentially obtaining the plurality of frames F in the predetermined order corresponding to a replay speed of a moving image.

After these data transfer has been completed, the data not necessary for later processing are sequentially deleted from (overwritten on) the working memory one by one.

This allows the processing to advance without producing and holding in a memory a complete copy of the moving image data after blur correction corresponding to whole moving image data before blur correction, and therefore an objective moving image can be reproduced in real time by sequentially performing blur correction even if the amount of moving image data is very large or a memory has little available capacity.

The decoder 5, for example, also decodes the coded moving image data to calculate the quantized coefficients and motion vectors, performs inverse quantization to convert the quantized coefficients to DCT coefficients, performs inverse DCT transforms that calculate pixel values (difference between pixel values) for blocks of 8×8 pixels as a unit based on the DCT coefficients, and further decodes P-pictures and B-pictures by adding the blocks compensated by the difference between pixel values and motion vectors.

When moving image data recorded without blur correction processing are reproduced, the blur correction processing unit (blur correcting section) 10, for example, detects the amount of the blur, that is, the amount of movement of a frame F, and corrects the blur. Specifically, the blur correction processing unit 10 includes, for example, a frame processor 10A, a macroblock selector 10B, a blur estimator 10C, an interpolation processor 10D, a display region setter 10E, and the like.

The frame processor 10A, for example, performs a processing for giving serial numbers to the plurality of frames F constituting the bit stream decoded by the decoder 5.

The frame processor 10A, for example, also determines for each of the plurality of frames F whether the image is an I-picture that is impossible to obtain the motion vector (motion compensation information), and outputs the result of determination to the macroblock selector 10B and the interpolation processor 10D.

The macroblock selector 10B, for example, selects a macroblock appropriate for calculating a total motion vector (blur amount) of the frame F for the frames (e.g., P-pictures and B-pictures) that the frame processor 10A determines to be other than I-picture.

That is, in case of MPEG 4 stream for a VGA size, for example, one frame F has 1,200 macroblocks (see FIG. 2), including Inter macroblocks with inter-frame correction and Intra macroblock without inter-frame correction. It is understood that the total motion vector concerning the entire one frame F can be calculated by taking an average of motion vectors for Inter macroblocks out of these macroblocks.

However, since there is a possibility that erroneous motion vectors are produced when the frame F is encoded, all motion vectors are not always appropriate for calculating the total motion vector. Further, it is not suitable to perform detecting operation again to determine whether motion vectors are erroneously detected. Therefore, by determining the possibility of erroneous detection based on various kinds of information concerning the macroblocks, macroblocks having higher credibility are selected.

When determining the credibility of motion vector by the macroblock selector 10B, since processing of all macroblocks in one frame F causes large calculation load, the frame F is divided into macroblock groups, each group consisting of 16 (4×4) macroblocks), and one macroblock is selected out of each group to determine the credibility. In a case of having high credibility, the macroblock is selected for estimating a total motion vector, and in a case of having low credibility, the same process is applied to another macroblock within the macroblock group (for example, next macroblock).

The macroblock selector 10B determines the credibility of a motion vector of a macroblock of the frame F based on a degree of flatness of an image part associated with the macroblock.

That is, in one frame F, the flat and featureless part is easy to have erroneous detection of the motion vector, therefore the motion vector of the macroblock associated with the featureless and flat part of the image has low credibility, and the part is not used for estimating a total motion vector.

More specifically, the Q factor (quantization parameter), provided for encoding image data of macroblocks by the encoder 2, is small at the flat and featureless part, and is large, on the other hand, when the part has many frequency components. Therefore, the macroblock selector 10B determines the degree of flatness of an image based on the Q factor.

Further, the macroblock selector 10B, for example, determines a success degree of motion compensation of a macroblock in a frame F based on DC coefficient after DCT transformation by the encoder, and then determines the credibility of a motion vector of the macroblock based on the result of the determination.

That is, the DC coefficient is a difference of DC component with respect to the reference block after DCT, and therefore in case that the DC coefficient is large, there is a large possibility that the large difference of DC component relative to the reference block is resulted from the fact that motion compensation was not performed at a right position. Accordingly, when DC coefficient is larger than a predetermined threshold value, the motion vector of the macroblock has a low credibility and the block is not used for estimating a total motion vector.

The blur estimator 10C, for example, obtains motion vectors of the plurality of macroblocks suitable for estimating a total motion vector of one frame F selected by the macroblock selector 10B, and performing an average process for these motion vectors to calculate the amount of blur (total motion vector) of the frame F.

Specifically, each time the decoder 5 obtains the predetermined frame F sequentially and transfers it to the blur correction processing unit 10, the blur estimator 10C calculates the amount of blur of the frame F. That is, the blur estimator 10C constitutes a motion compensation information obtaining section for sequentially obtaining each amount of blur of the frame F corresponding to the obtaining speed and order of the frames F by the decoder 5.

The interpolation processor 10D calculates a total motion vector of an I-picture with interpolation processing based on total motion vectors of frames F positioned before and after the I-picture, which are identified by the frame processor 10A.

This allows even I-picture, which does not have a motion vector, to obtain the total motion vector, so that blur correction processing can be suitably performed when the moving image is reproduced.

The display region setter 10E, for example, sets a display region R in a frame F of a moving image to be displayed on the internal display 7 and the external display device 600. Specifically, when the moving image having frames F is reproduced, based on the total motion vectors of P-pictures and B-pictures, which are calculated (estimated) by the blur estimator 10C, and the total motion vector of I-picture calculated by the interpolation processor 10D, the region setter 10E enables a display region R2 in one frame F2 (see FIG. 3B) to be moved from a display region R1 in a previous frame F1 (FIG. 3A) by the amount of the total motion vector, whereby blur correction is performed sequentially for these frames F. As a result, a blur corrected moving image (FIG. 3C) can be reproduced and displayed in real time on the internal display 7 and the external display device 600.

Figure 3A:
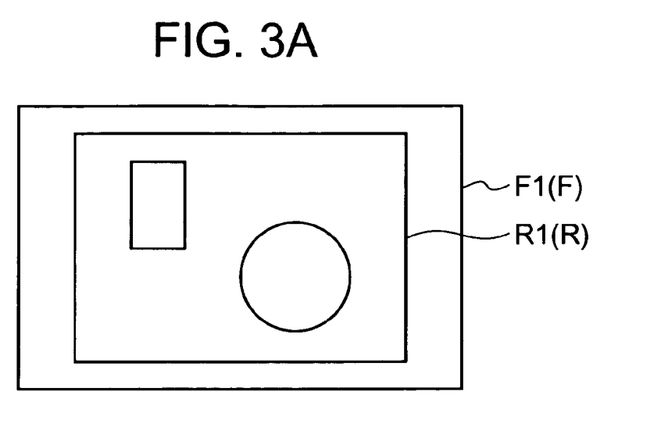
FIGS. 3A to 3C are views schematically showing the frame and display region that relate to a moving image replay processing, by the imaging device shown in FIG. 1.
Figure 3B:
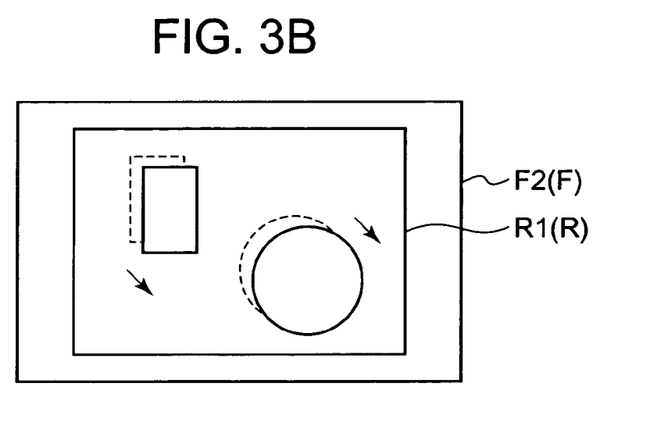
Figure 3C:
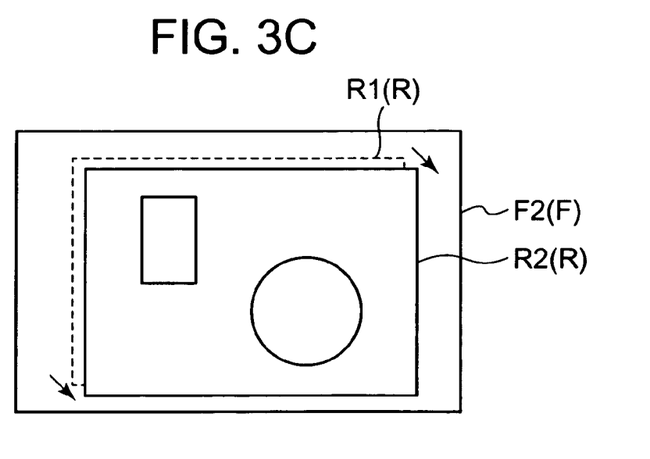

Here, FIG. 3A schematically illustrates the previously displayed frame F1 and the display region R1, FIG. 3B schematically illustrates the frame F2 and the display region R2 to be naturally displayed subsequent to the frame F1, and FIG. 3C schematically illustrates the frame F2 and the display region 2 displayed after blur correction.

The display region setter 10E may, for example, have a function of controlling expansion/shrinkage of the moving image to be displayed on each of the internal display 7 and the external display device 600 at the time of replay. Specifically, the size of the display region R may be changed corresponding to scale factors instructed by a user through a predetermined operation on an operation unit (not shown).

The first display processor 6, for example, processes a frame trimmed as a necessary portion so as to conform to display specifications of the internal display 7, and outputs signals necessary for display. Further, in the case that recorded resolution differs from the resolution of a display device, the first display processor 6 performs processing of pixel interpolation or pixel thinning.

The first display processor 6, for example, may include a buffer memory (not shown) to synchronize with a delay time caused by an interpolation process for a total motion vector performed by the interpolation processor 10D.

The internal display 7 includes, for example, a liquid crystal display device built in a main body of the device and displays various kinds of images for confirmation based on the image data decoded by the decoder 5. That is, the display unit 7 displays a small display-size moving image and is used not for enjoying the moving image but for confirmation of it.

The second display processor 8, for example, performs processing similar to the first display processor 6 and acts as an externally outputting section for sequentially outputting frames F applied blur correction by the blur correction processing unit 10, to the external display device 600 through the externally outputting terminal 9.

Further, the second display processor 8, for example, performs processing of generating synchronizing signals (vertical and horizontal synchronizing signals) based on input specifications of the external display device 600, of scanning the frame F to convert to a serial video signal, and of outputting these signals as a composite signal.

The externally outputting terminal 9 is provided for connection with the external display device 600 such as a television or the like, to display the image for enjoying.

A description will be given of a moving image replay processing with reference to FIGS. 4 and 5.

Figure 4:
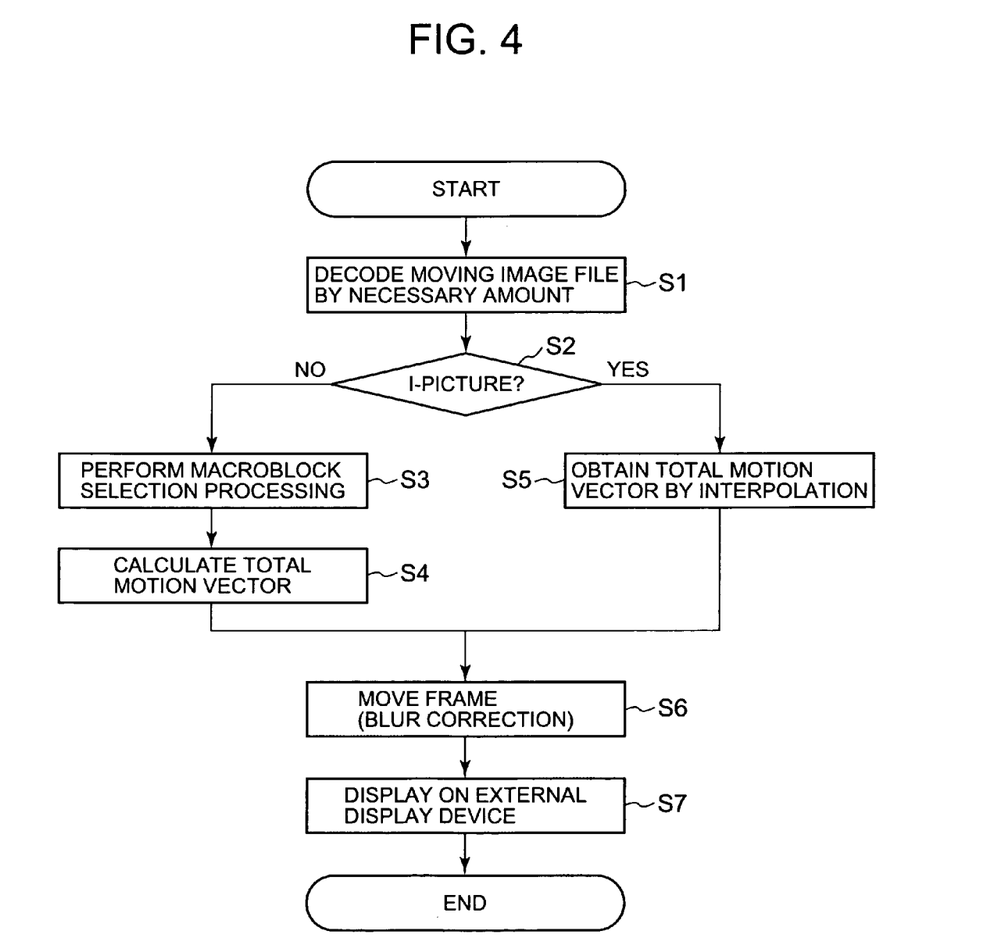
FIG. 4 is a flowchart showing an example of operation according to the moving image replay processing of FIGS. 3A to 3C.
Figure 5:
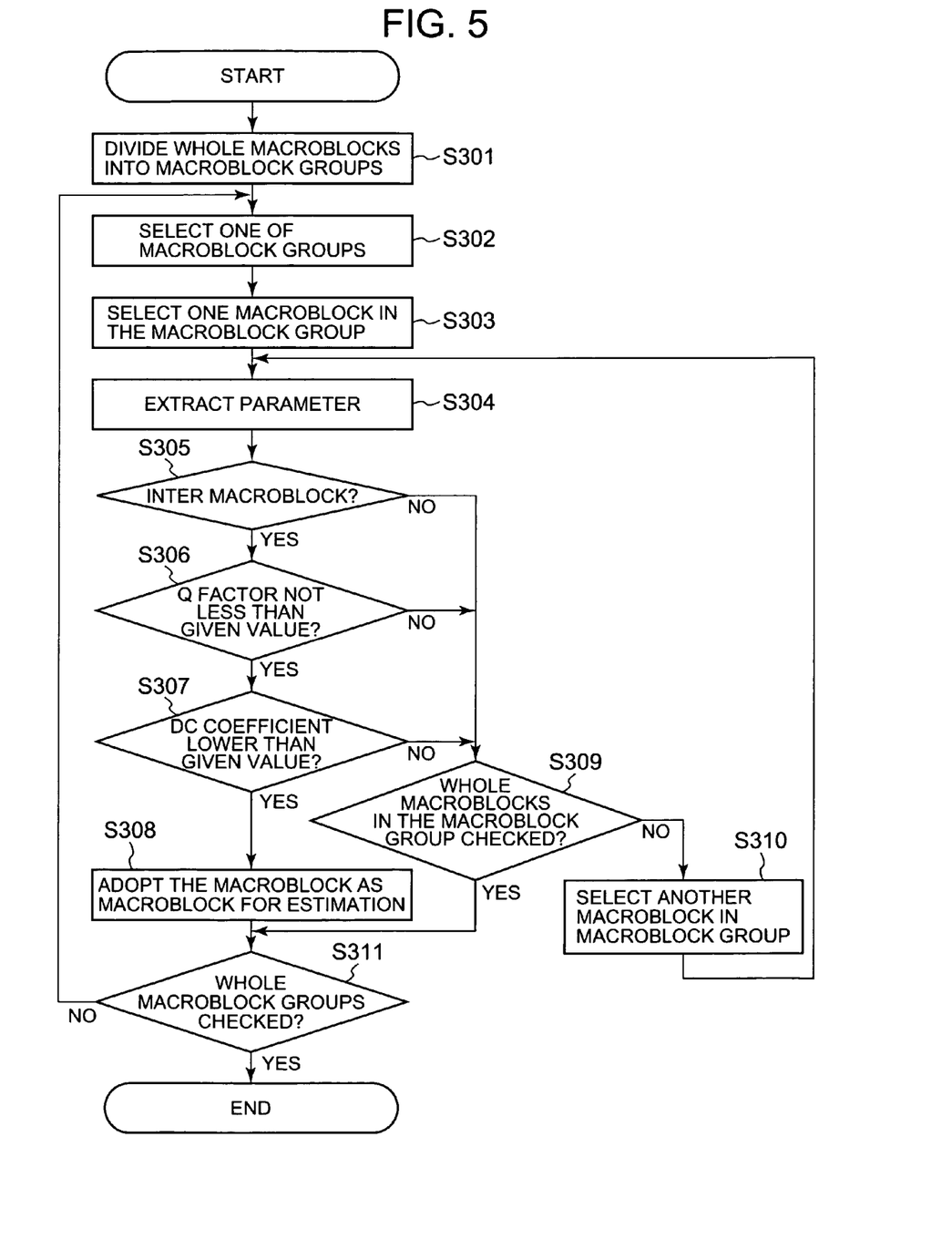
FIG. 5 is a flowchart showing one example of an operation according to a macroblock selection processing in the moving image replay processing of FIGS. 3A to 3C.

FIG. 4 is a flowchart showing one example of operation according to the moving image replay process, and FIG. 5 is a flowchart showing one example of operation according to a macroblock selection processing in the moving image replay processing.

In the moving image replay processing to be described below, the moving image is reproduced on the external display device 600 connected through the externally outputting terminal 9.

As shown in FIG. 4, when replay of moving image recorded in one of the internal recorder 3, the memory card M and the external recording device 500, is instructed according to a predetermined operation on the imaging device 100 by a user, first of all, the decoder 5 obtains an MPEG moving image file from the storage section 3 or the like by a necessary amount of data for replay of the moving image to the minimum, and decodes the data to produce a bit stream (step S1). That is, while reading the minimum amount of data which are necessitated by the frame processor 10A, the macroblock selector 10B, and the first and second display processors 6 and 8, into a predetermined working memory, corresponding to a replay speed of the moving image, the decoder 5 decodes the data sequentially. Then, the decoder 5 transfers the decoded predetermined frames F one by one to the frame processor 10A, the macroblock selector 10B, the first and second display processors 6 and 8, and the like.

The frame processor 10A performs a processing to apply order to a predetermined number of frames F included in the bit stream transferred from the decoder 5, as well as determines whether it is an I-picture or not for each of the frames F (step S2). Then, I-picture is marked, and the result of determination by the frame processor 10A is sent to the macroblock selector 10B and the interpolation processor 10D.

For the frame F which was determined that it is not I-picture (step S2; NO) in step S2, the macroblock selector 10B performs macroblock selection processing (step S3).

Hereinafter, the macroblock selection processing will be explained with reference to FIG. 5.

Figure 2:
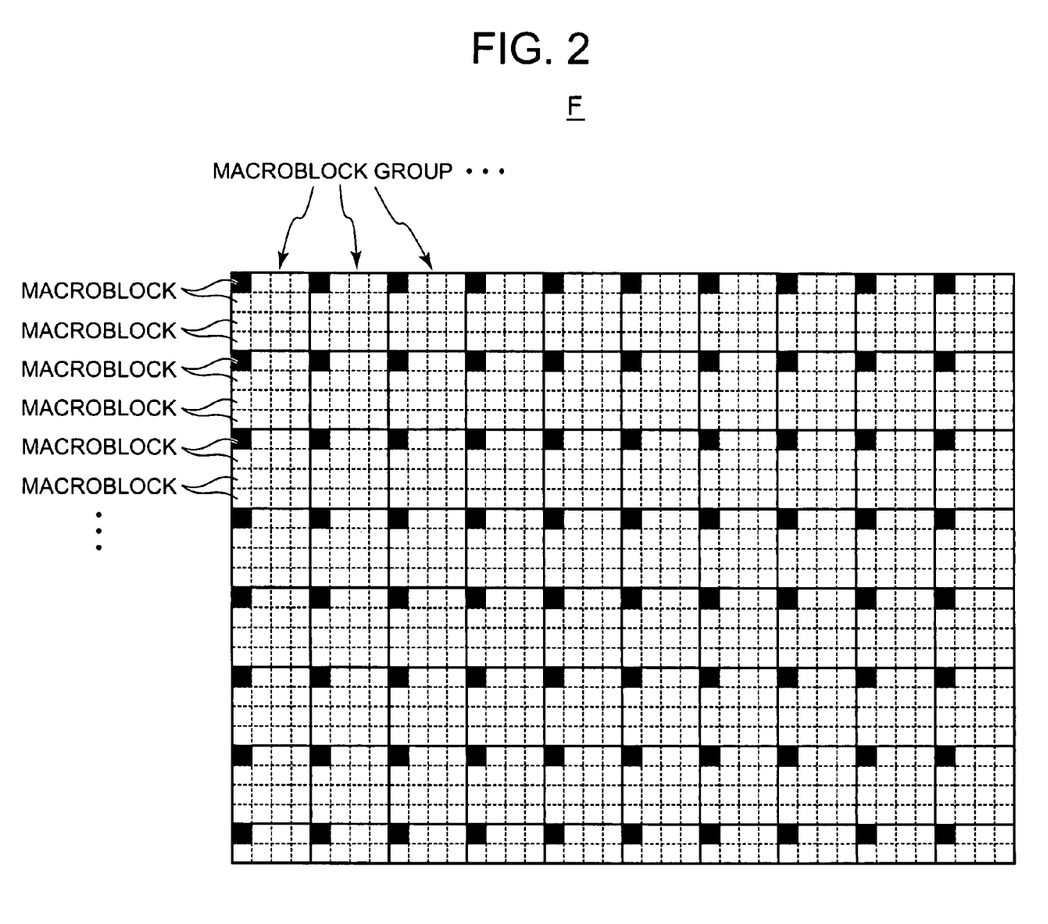
FIG. 2 is a view schematically showing a frame that structures a moving image displayed on a display of the imaging device shown in FIG. 1.

As shown in FIG. 5, the macroblock selector 10B divides macroblocks of the inputted frame F into macroblock group (a 4 by 4 group of macroblocks) (refer to FIG. 2, step S301).

Thereafter, the macroblock selector 10B selects one macroblock group among the divided macroblock groups (step S302), and selects one macroblock in the selected macroblock group (for example, black filled macroblock in upper left corner in FIG. 2) (step S303).

Next, the macroblock selector 10B extracts Q factor relating to the macroblock, and various kinds of parameters relating to selection of macroblock such as DC coefficient related to the macroblock, from the decoded bit stream (step S304).

Then, the macroblock selector 10B determines whether the selected macroblock is an Inter macroblock or not, on the basis of an Intra/Inter flag (step S305).

Here, when it is determined that it is an Inter macroblock (step S305; YES), the macroblock selector 10B determines whether the Q factor of the macroblock is not less than a given value (step S306).

When it is determined that the Q factor is not less than the given value, that is, when it is determined that the macroblock has a large amount of frequency component (step S306; YES), the macroblock selector 10B determines whether DC coefficient of the macroblock after DCT is not more than a given value (step S307).

Here, when it is determined that the DC coefficient is not more than the given value (step S307; YES), the macroblock selector 10B adopts the macroblock as the macroblock to estimate the total motion vector (step S308).

On the other hand, when it is determined that it is not Inter macroblock, that is, it is determined that it is Intra macroblock of independent type which have no motion vector (step S305; NO) in step S305, when it is determined that the Q factor is less than the given value (step S306; NO) in step S306, or when it is determined that the DC coefficient is more than the given value, that is, it is determined that there is a large possibility that motion compensation has not been performed at the correct position (step S307; NO) in step S307, the macroblock selector 10B determines whether or not determination of various kinds of parameters are performed for all of the macroblock in the macroblock group including the present macroblock (step S309).

Here, when it is determined that determination is not performed for all of the macroblock (step S309; NO), the macroblock selector 10B selects another macroblock in the macroblock group (step S310), and moves on to step S304 and performs the following processing.

When it is determined that it is determined for all of the macroblock in step S309, or when it is adopted as the macroblock for estimation in step S308, it is determined whether estimation of macroblock relating to estimation of a total motion vector is performed for all the macroblock group (step S311).

Here, when it is determined that estimation of macroblock is not performed for the whole macroblock group (step S311; NO), the macroblock selector 10B moves on to step S302 and performs the following processing.

Further, in step S311, when it is determined that estimation of macroblock is performed for all the macroblock groups (step S311; YES), the macroblock selection processing is completed.

After completion of the macroblock selection processing, as shown in FIG. 4, the blur estimator 10C obtains motion vector of the plurality of macroblocks relating to one frame F adopted by the macroblock selector 10B, and calculates the total motion vector of the frame F by performing averaging processing of these motion vectors (step S4).

Next, with respect to the frame F (I-picture) that is determined to be I-picture in step S2 (step S2; YES), the interpolation processor 10D obtains the total motion vector of a frame F which is one after the I-picture, from the blur estimator 10C, and performs interpolating calculation between the total motion vector of the frame F and the total motion vector of the frame F which is one before the I-picture. Thus, the total motion vector of the I-picture is obtained (step S5).

Subsequently, regarding the plurality of frames F where the total motion vector are obtained, the display region setter 10E performs blur correction of moving image by moving the display region R of one frame F from the display region R of the previous frame F, for the amount of the total motion vector (step S6; refer to FIGS. 3A-3C).

Then, the second display processor 8, for example, outputs the (blur corrected) frames F in which necessary portions are trimmed by the display region setter 10E, to the external display device 600 sequentially, through the externally outputting terminal 9, thereby to display the moving image on the external display device 600 (step S7).

As described above, according to the imaging device 100 of the first embodiment can sequentially perform blur correction on a plurality of frames F which are sequentially obtained in a predetermined order corresponding to a replay speed of the moving image, based on each motion compensation information of frames F that are sequentially obtained corresponding to the obtaining speed and the predetermined order of the frames F and further can output the blur corrected frames F to the external display device 600 sequentially. Accordingly, the imaging device can preferably perform blur correction processing for moving image to be output to the external display device 600.

That is, even when images are captured by the imaging device 100 or another imaging device with no blur correction or not enough blur correction, and are encoded in accordance with MPEG standard and are then recorded as moving image data in the internal recorder 3, the memory card M, the external recording device 500 or the like, when the moving image data are output to the external display device 600 to replay the moving image, a plurality of frames constituting the moving image data can be sequentially obtained in a predetermined order corresponding to a replay speed of the moving image. Specifically, the coded frames can be decoded to obtain each of frames F sequentially. Further, motion vectors, generated when coded moving image data including coded frames are encoded, can be sequentially obtained. By using these frames F and motion vectors, blur correction can be performed for the frames F in the predetermined order and the frames F after the blur correction can be sequentially output. Accordingly, blur correction processing can be suitably performed in real time.

Since the first and second display processors 6 and 8 can change the form of blur corrected frame F to suitable one corresponding to the input specification of image signal for the internal display 7 or the external display device 600, to output the frame F, therefore a moving image after blur correction can be appropriately displayed on any types of the internal display 7 or the external display device 600.

Further, since the moving image data are encoded in accordance with MPEG standard, a total motion vector of the frame F can be estimated based on motion vectors of the plurality of macroblocks of the frame F constituting the moving image data.

At this time, macroblocks having a high credibility motion vector are selected among the plurality of macroblocks constituting the frame F as macroblocks for estimating a total motion vector. Therefore, macroblocks having a low credibility due to production of erroneous motion vector at the time of encoding are eliminated when estimating the total motion vector, so that estimation of the total motion vector can be more properly performed.

Accordingly, even for moving images recorded with no blur correction, blur correction can be properly performed based on the estimated total motion vector of the frame F. As a result, this eliminates the need for searching the feature portions in one frame F and for comparing the previous and subsequent images for the feature portions in blur correction processing, thereby it is possible to suitably reduce the load of blur correction processing at the time of reproducing the moving image.

Second Embodiment

Hereinafter, an imaging device 200 of a second embodiment will be described with reference to FIG. 6.

Figure 6:
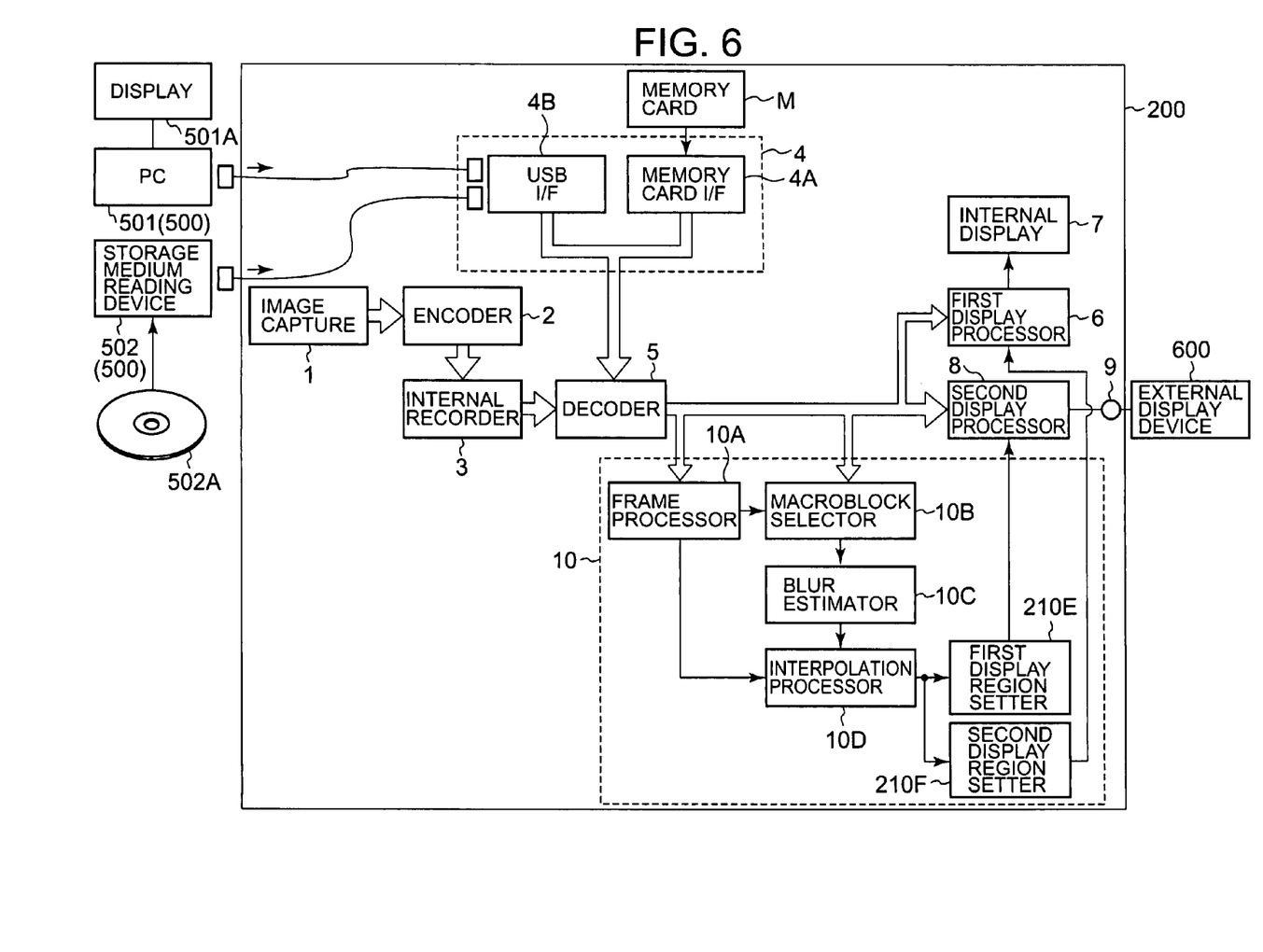
FIG. 6 is a block diagram showing a principal structure of an imaging device according to a second embodiment which is given as a preferable example of an image processing device to which the present invention is applied.

FIG. 6 is a block diagram showing a principal structure of an imaging device 200 according to a second embodiment which is given as a preferable example of an image processing device to which the present invention is applied.

The imaging device 200 according to the second embodiment is similar to the above-described first embodiment with the exception that the imaging device 200 is provided with a first display region setter 210E and a second display region setter 210F, therefore the same components are designated by the same reference numerals and the description thereof will be omitted.

In the imaging device 200 according to the second embodiment, display magnifications of moving images to be displayed on the internal display 7 and the external display device 600 can be set individually, so that the moving image can be displayed in parallel on both of the internal display 7 and the external display device 600.

That is, the imaging device 200 includes the first display region setter 210E corresponding to the internal display 7, and the second display region setter 210F corresponding to the external display device 600.

Each of the first display region setter 210E and the second display region setter 210F constitutes a display magnification changing section so that the size of each display region R can be individually changed, for example, corresponding to enlargement/reduction magnification designated by a predetermined operation on an operation unit by the user.

As described above, according to the imaging device 200 of the second embodiment, since the display magnifications for moving images which are displayed on the internal display 7 and the external display device 600 can be changed individually, display sizes of the moving images which are displayed on the internal display 7 and the external display device 600 can individually be enlarged or reduced. Therefore, it is possible to perform display of moving images suitably.

In the first and second embodiments, blur correction is performed based on moving image data recorded in the internal recorder 3, the memory card M and the external recording device 500, but not limited thereto, and the moving image data relating to blur correction may be recorded at least in any one of these units. Accordingly, the imaging device 100 (200) or the like, according to the invention is not necessarily provided with all of the internal recorder 3, the memory card M and the external recording device 500.

Third Embodiment

Hereinafter, an imaging device 300 according to a third embodiment will be described with reference to FIGS. 7 and 8.

Figure 7:
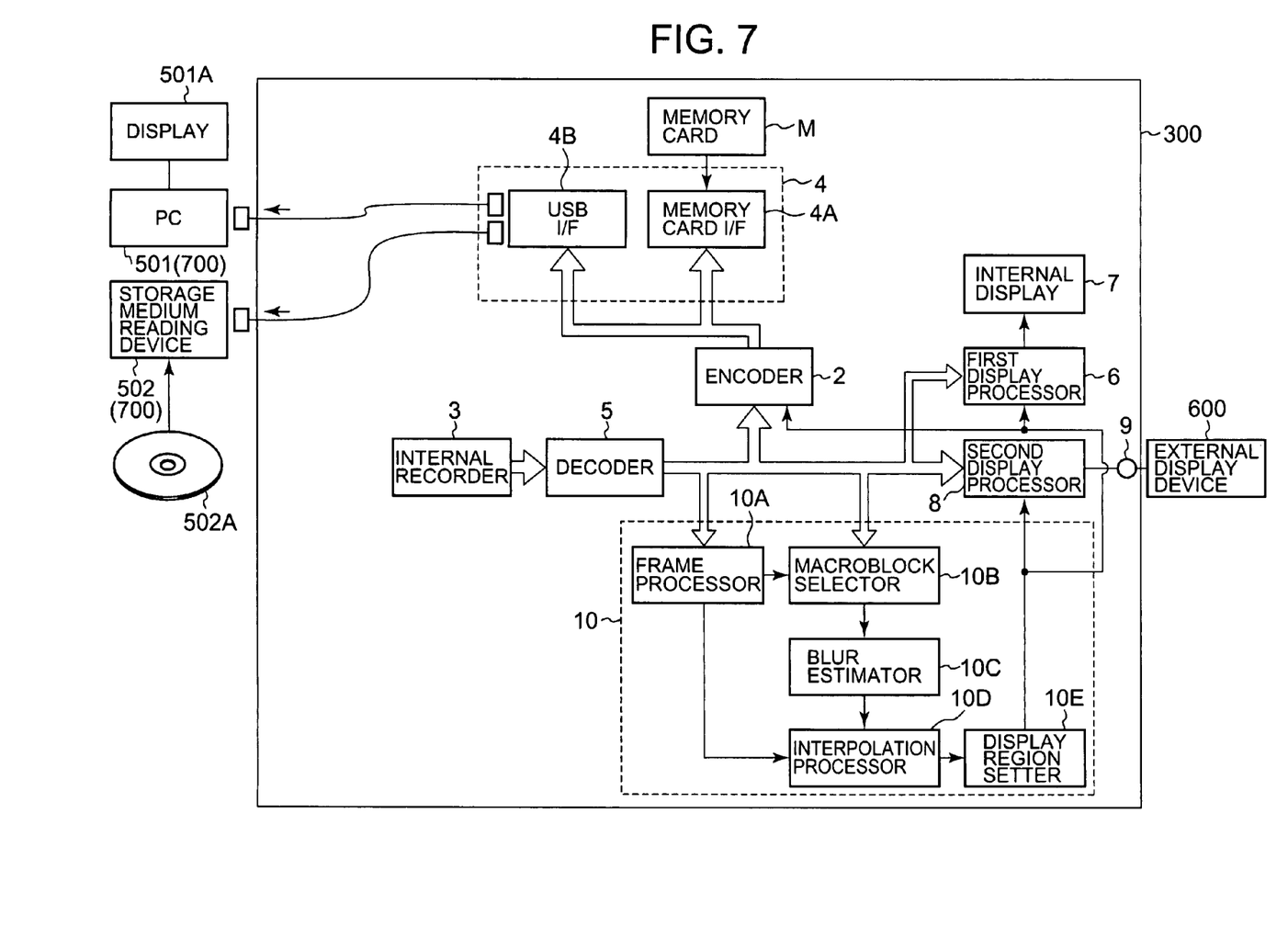
FIG. 7 is a block diagram showing a principal structure of an imaging device according to a third embodiment which is given as a preferable example of an image processing device to which the present invention is applied.

FIG. 7 is a block diagram showing a principal structure of an imaging device 300 according to a third embodiment which is given as a preferable example of an image processing device to which the present invention is applied.

The imaging device 300 according to the second embodiment is similar to the above-described first embodiment with the exception that blur corrected moving image data are encoded again and output to the outside, therefore the same components are designated by the same reference numerals and the description thereof will be omitted. In FIG. 7, the image capture 1 is not shown to be simplified.

The imaging device 300 of the third embodiment can reproduce a moving image after blur correction processing, for example, on image reproducing device 700 or the like that does not have a blur correction function. Specifically, the encoder 2 again encodes blur corrected frames F output from the display region setter 10E to generate coded moving image data, and the encoded moving image data are then output to the memory card M, storage medium reading device 502, PC 501 or the like (image reproducing device 700) through the external recording control section 4.

Here, the external recording control section 4 constitutes a reproducing device connecting section for connecting to the PC 501 or the like that reproduces the moving image according to the coded moving image data encoded by the encoder 2.

Next, a moving image output processing will be explained with reference to FIG. 8.

Figure 8:
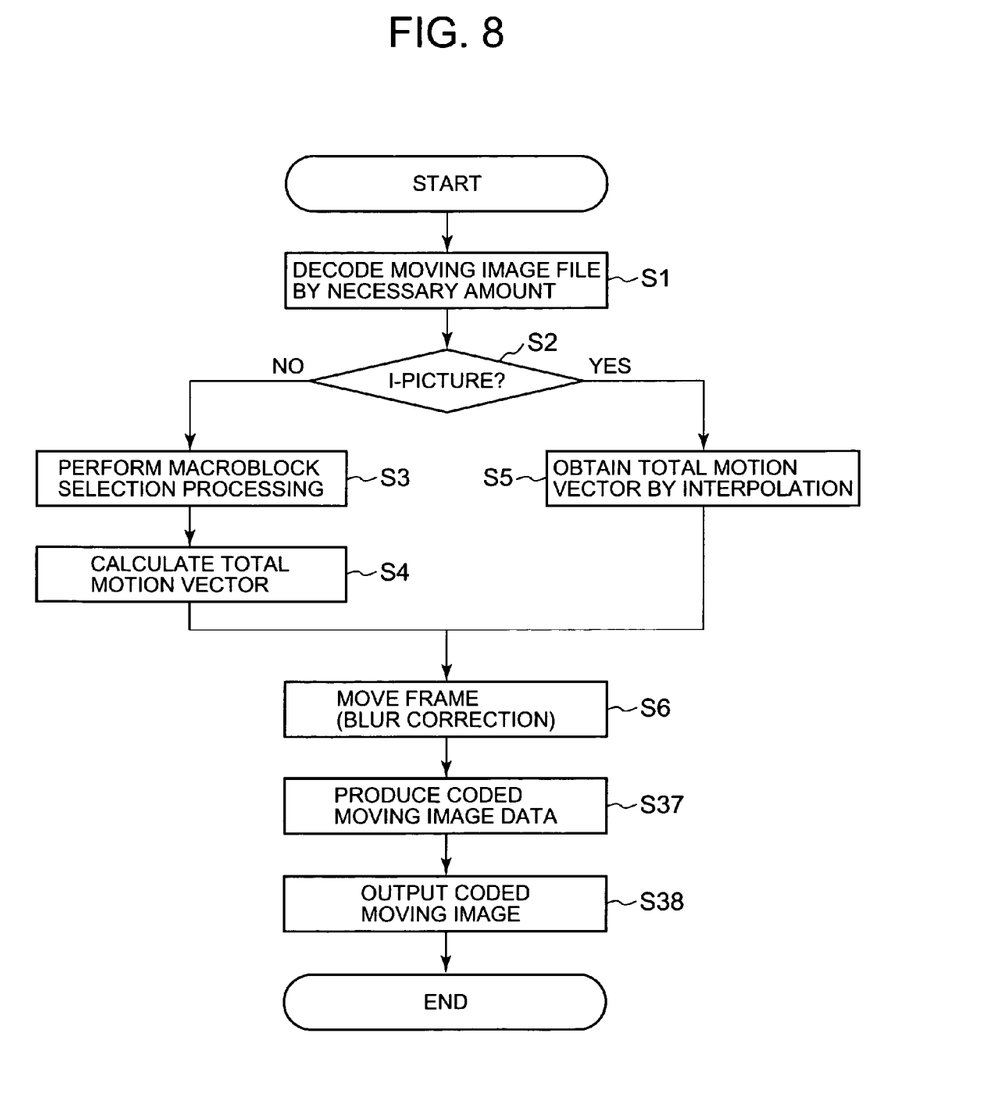
FIG. 8 is a flowchart showing an example of the operation according to a moving image output processing by the imaging device of FIG. 7.

FIG. 8 is a flowchart showing one example of operation according to a moving image output processing by the imaging device 300. The moving image output processing by the imaging device 300 is similar to those (see FIGS. 4 and 5) performed by the imaging device 100 and 200 of the first and second embodiments with the exception of encode processing and output processing, and the description of the similar processing will be omitted.

For example, when a moving image output mode is instructed for storing again after applying blur correction to coded moving image data stored in the internal recorder 3, the coded moving image data encoded by the encoder 2 based on image capturing of a subject, the imaging device 300 performs moving image output processing.

In the moving image output processing, after blur correction of the moving image in step 6, the encoder 2 sequentially performs encode processing on a plurality of frames F that the display region setter 10E trimmed as necessary portions, and produces coded moving image data (step S37).

Subsequently, the external recording control section 4 outputs the coded moving image data to the memory card M, the storage medium reading device 502, the PC 501 or the like (step S38).

Thus, according to the imaging device 300, the plurality of frames F, to which blur correction has been applied, are encoded and produced as coded moving image data, and then the coded moving image data are recorded into the memory card M and reproduced as the moving image relating to the coded moving image information by using the image reproducing device 700. That is, use of the coded moving image data can reproduce suitably blur corrected moving image even on the image reproducing device 700 that does not have a blur correction function.

In the above-described third embodiment, the coded moving image data are output to the memory card M, the image reproducing device 700 or the like, but not limited thereto, and may be output to at least one of these units. Accordingly, the imaging device 300 according to the invention is not necessarily provided with all of the memory card M and the external recording device 500.

Fourth Embodiment

Hereinafter, an imaging device 400 according to a fourth embodiment will be described with reference to FIGS. 9 and 10.

Figure 9:
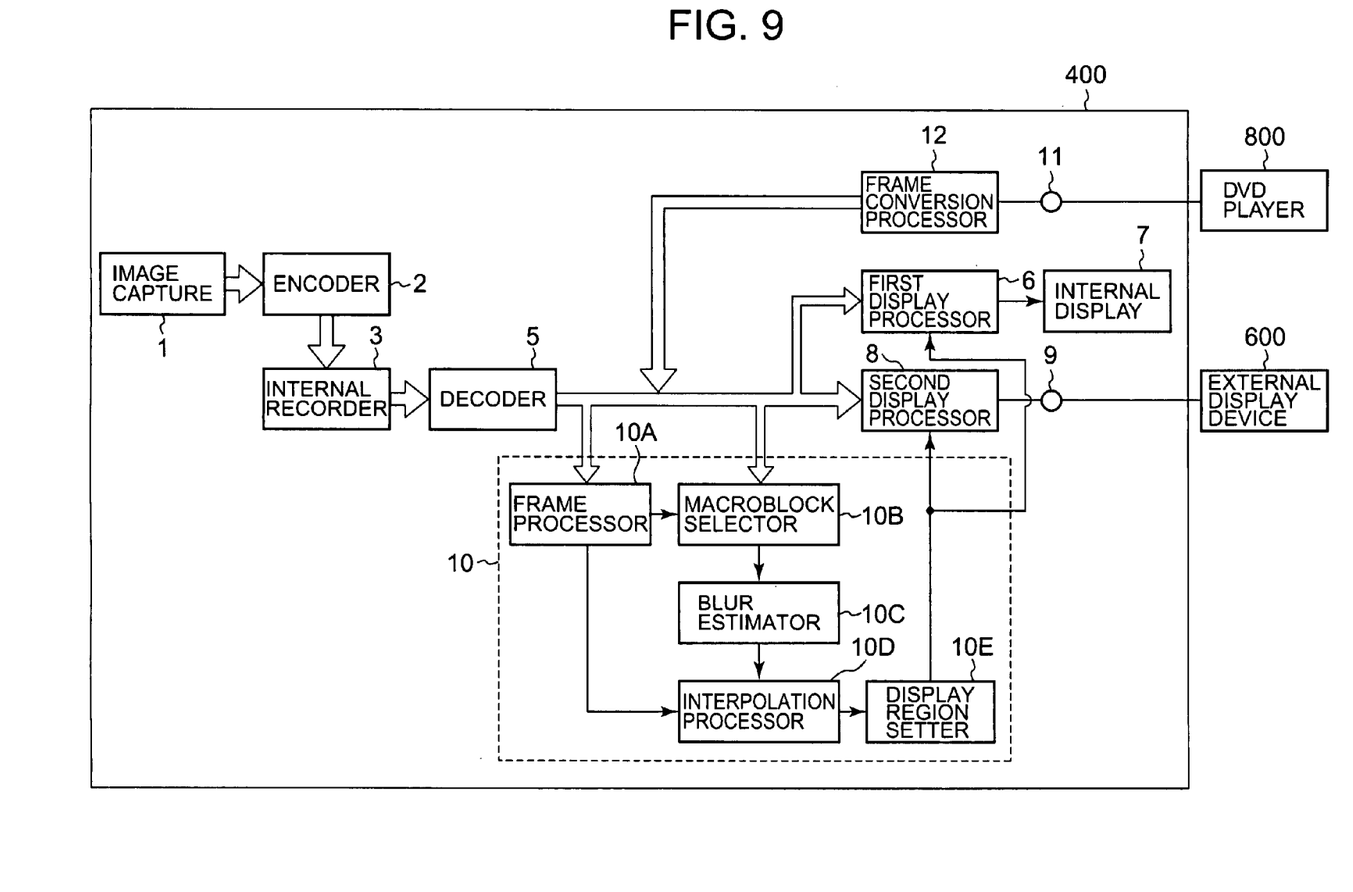
FIG. 9 is a block diagram showing a principal structure of an imaging device according to a fourth embodiment which is given as a preferable example of an image processing device to which the present invention is applied.

FIG. 9 is a block diagram showing a principal structure of an imaging device 400 according to a fourth embodiment which is given as a preferable example of an image processing device to which the present invention is applied.

The imaging device 400 of the fourth embodiment is similar to the above-described first embodiment with the exception that frames F are sequentially generated depending on moving image data output from a DVD player 800 and blur correction is applied to the frames F, therefore the same components are designated by the same reference numerals and the description thereof will be omitted.

The imaging device 400, for example, functions as a device for correcting blur of the moving image outputted from the DVD player 800 (image information output device).

That is, the imaging device 400, for example, constitutes a moving image replay system together with the DVD player 800, and is positioned between the DVD player 800 and the external display device 600 and connected with them. Specifically, the imaging device 400 includes an externally input terminal (output device connecting section) 11 that is connected with the DVD player 800, and a frame conversion processor (frame generating section) 12 that sequentially generates frames F based on a video signal (moving image data) outputted from the DVD player 800 connected through the externally input terminal 11 and inputted thereto.

Meanwhile, a frame generation processing by the frame conversion processing section 12 is a known technique, and a detailed description thereof is omitted.

Next, a moving image replay processing will be explained with reference to FIG. 10.

Figure 10:
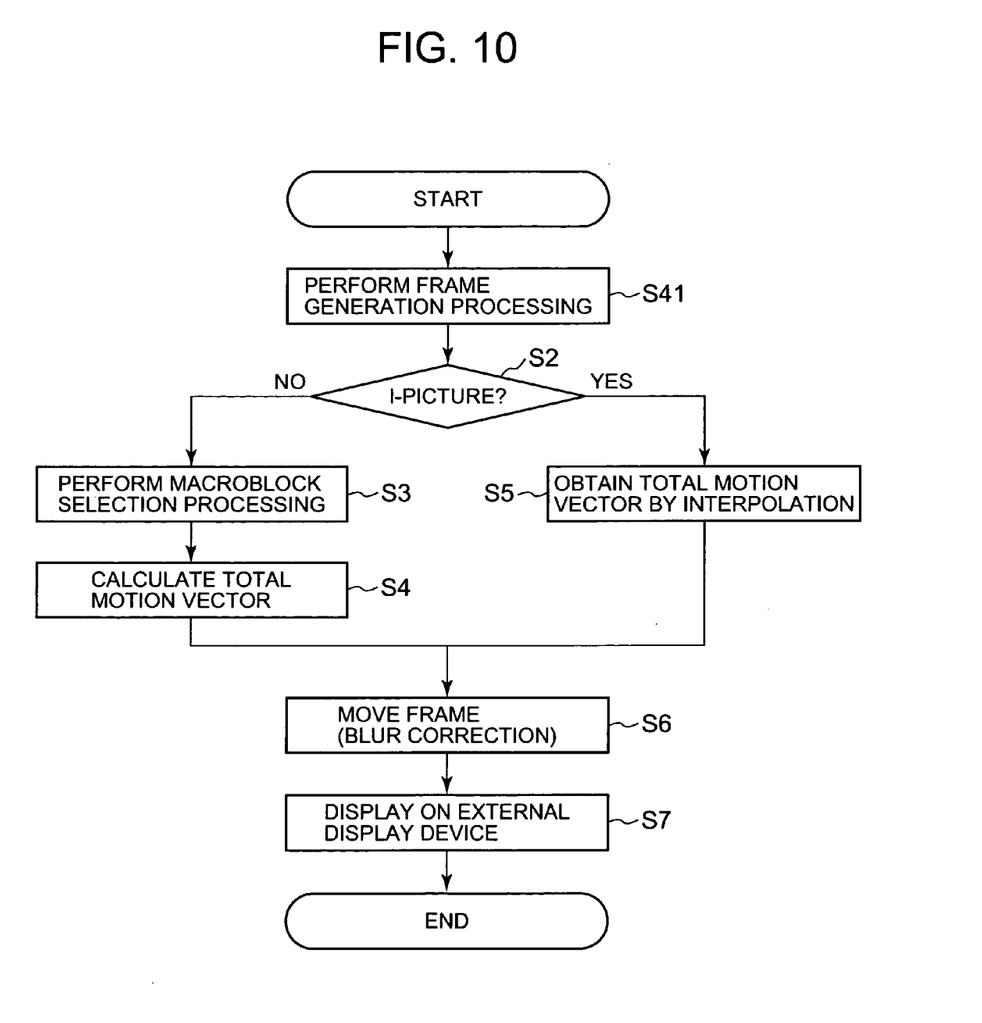
FIG. 10 is a flowchart showing an example of the operation according to a moving image output processing by the imaging device of FIG. 9.

FIG. 10 is a flowchart showing one example of operation according to a moving image replay processing by the imaging device 400. The moving image replay processing by the imaging device 400 is similar to those (see FIGS. 4 and 5) performed by the imaging device 100 of the first embodiment with the exception of the frame generation processing, and therefore the description thereof will be omitted.

That is, when a mode for configuring a moving image replay system is instructed, for example, the imaging device

400 first performs frame generation processing in the moving image replay processing (step S41).

When performing the frame generation processing, the frame conversion processing section 12 sequentially generates frames F based on a video signal (moving image data) outputted from the DVD player 800 and inputted thereto, and sequentially transfers predetermined frames F to the frame processor 10A, the macroblock selector 10B, and the first and second display processors 6 and 8.

Subsequently, the processing moves to step S2, and the following processing is performed.

Thus, according to the imaging device 400 of the fourth embodiment, frames F can be sequentially generated based on the moving image data outputted from the DVD player 800 and inputted to the imaging device, therefore the imaging device can sequentially obtain the generated frames F corresponding to a replay speed of the moving image in the predetermined order to thereby suitably perform blur correction of the moving image.

In the embodiment, the DVD player 800 is exemplified as an image information output device, but the device is not limited thereto, and may be a DVD recorder or the like so long as it has an output terminal capable of outputting moving image data.

The present invention is not limited to the embodiments described above, and various improvements and modifications may be made without departing from the scope of the invention.

For instance, the embodiment adopts the Q factor of a macroblock as a parameter for determining a degree of flatness of an image portion relating to the macroblock by the macroblock selector 10B, but not limited thereto. That is, since flat and featureless image portions in the frame F are compressed with high efficiency and with less amount of code, the macroblock selector 10B may adopt the amount of code of the macroblock as a parameter for determining the degree of flatness of the image portion.

In the embodiments, macroblocks for estimating a total motion vector are determined based on a Q factor and DC coefficient after DCT of each macroblock, but not limited thereto, and, for example, the macroblock may be determined by using at least either of the Q factor and DC coefficient, or the amount of code of the macroblock may be used as a parameter for determination in addition to either one.

Further, in the embodiments, a total motion vector relating to I-picture which does not have a motion vector, is interpolated based on the total motion vectors of previous and subsequent frames F, but a method of obtaining a total motion vector for the I-picture is not limited to this. That is, the imaging device 100, 200, 300 or 400, for example, may extract a predetermined feature point from the I-picture, track a feature point on either of the previous and subsequent frames F of the I-picture (for example, the previous frame F) corresponding to the extracted feature point using a KLT (Kanade-Lucas-Tomasi) feature tracking algorithm or the like, and decide an total motion vector of the I-picture based on the result of tracking the feature point (movement amount of the feature point).

Additionally, in the embodiments described above, the imaging device 100, 200, 300 and 400, which capture an image and display (reproduce) a captured still image or moving image, are exemplified as an image processing device according to the invention, but the image processing device is not limited to these devices, and may be any device such as a video reproducing device so long as it can output at least moving image data to the external display device 600. For instance, it is also possible to use a personal computer (PC, not shown) or the like as an image processing device. The PC obtains a moving image file, and implements the invention based on a predetermined program of the PC, by performing processing of, as described above, sequentially obtaining frames F, sequentially obtaining motion vector correction information, sequentially correcting blur of the frames F, and sequentially outputting the blur corrected frames F to the external display device 600.

What is claimed is:

1. An image processing device having a blur correction function comprising:
    a connecting section to connect to an external device;
    a frame obtaining section to obtain a plurality of frames constituting moving image data sequentially, based on an instruction to reproduce moving image data recorded in a predetermined form, corresponding to a speed and an order of reproducing a moving image;
    a motion compensation information obtaining section to obtain respective motion compensation information of the frames obtained by the frame obtaining section, corresponding to the speed and the order of reproducing the moving image;
    a blur correcting section to perform blur correction to the frames obtained by the frame obtaining section sequentially, based on the motion compensation information obtained by the motion compensation information obtaining section; and
    an externally outputting section to output the frames sequentially, to which the blur correction has been performed by the blur correcting section, to the external device connected to the connecting section.

2. The image processing device as claimed in claim 1, wherein the connecting section is connected to a video input line of the external device having a function of displaying moving images, and the externally outputting section changes the frames to which blur correction was performed, to a form corresponding to an input specification of video signals for the external device, to output.

3. The image processing device as claimed in claim 1, wherein each of the frames, to which the blur correction was performed by the blur correcting section, is discarded one by one without saving after being output to the external device by the externally outputting section.

4. The image processing device as claimed in claim 1, further comprising an internal recorder to record the moving image data,
    wherein the frame obtaining section obtains the plurality of frames constituting the moving image data sequentially from the internal recorder when receiving an instruction to reproduce the moving image data recorded in the internal recorder.

5. The image processing device as claimed in claim 1, further comprising a reading device to read data out of a removable external recording medium,
    wherein the frame obtaining section obtains the plurality of frames constituting the moving image data sequentially from the external recording medium mounted on the storage medium reading device when receiving an instruction to reproduce the moving image data recorded in the external recording medium.

6. The image processing device as claimed in claim 1, further comprising a second connecting section to connect to a second external device,
    wherein the frame obtaining section further obtains the plurality of frames constituting the moving image data from the second external device which is connected through the second connecting section.

7. The image processing device as claimed in claim 1, wherein the moving image data are encoded moving image data including a plurality of encoded frames which were encoded according to an information compression technique which performs motion compensation, the frame obtaining section decodes the plurality of encoded frames to obtain each of the frames, and the motion compensation information obtaining section obtains the motion compensation information generated when the moving image data are encoded.

8. The image processing device as claimed in claim 7, further comprising:

an internal display to display the moving image; and a display magnification changing section to change a display magnification of the moving image to be displayed on the internal display and the external device, individually.

9. The image processing device as claimed in claim 1, further comprising an encoding section to encode the plurality of frames to which blur correction was performed by the blur correcting section, to generate coded moving image data, wherein the externally outputting section outputs the encoded moving image data generated by the encoding section to the external device.

10. The image processing device as claimed in claim 1, further comprising a storage medium writing device to write data into a removable external recording medium, wherein the externally outputting section writes the encoded moving image data generated by the encoding section into the external recording medium through the storage medium writing device.

11. A control method of an image processing device having a blur correction function, performing:

a frame obtaining processing, to obtain a plurality of frames constituting moving image data sequentially, based on an instruction to reproduce moving image data recorded in a predetermined form, corresponding to a speed and an order of reproducing a moving image;

a motion compensation information obtaining processing, to obtain respective motion compensation information of the frames obtained by the frame obtaining processing, corresponding to the speed and the order of reproducing the moving image;

a blur correcting processing, to perform blur correction to the frames obtained by the frame obtaining processing sequentially, based on the motion compensation information obtained by the motion compensation information obtaining processing; and an externally outputting processing, to output the frames sequentially, to which the blur correction is performed by the blur correcting processing, to the external device.

* * * * *